2,803,642
PREPARATION OF ALIPHATIC NITRILES

William L. Fierce, Crystal Lake, and Walter J. Sandner, Carpentersville, Ill., assignors to The Pure Oil Company, Chicago, Ill., a corporation of Ohio No Drawing. Application December 28, 1955,
Serial No. 555,772

12 Claims. (Cl. 260—465.3)

This invention relates to the preparation of nitriles through the reaction of cyanogen and an olefin. More particularly, this invention is related to the high temperature preparation of acrylonitrile, acetonitrile, and other nitriles through the reaction of cyanogen with one or more olefins.

Unsaturated nitriles, particularly acrylonitrile, have found extensive use in various industries, notably as intermediates in the preparation of various organic chemicals. Acrylonitrile is frequently utilized as a reactant in the preparation of acrylopolymers and resins for the paint industry, acrylic plastics and nitrile rubber. Acrylonitrile is at present being commercially produced in tonnage amounts by two processes. One process is based upon the reaction of hydrogen cyanide with acetylene at 80° C. in an aqueous solution of cuprous chloride. In the other process, hydrogen cyanide and ethylene oxide are contacted at superatmospheric pressure and temperatures above 90° C. to yield ethylene cyanohydrin ($HO-CH_2-CH_2-CN$). Ethylene cyanohydrin is then dehydrated to yield acrylonitrile ($CH_2=CH-CN$). Another process for the preparation of acrylonitrile is disclosed in U. S. Patent 2,445,693. This patent discloses the non-catalytic pyrolysis of a gaseous mixture of non-aromatic hydrocarbons (containing at least 2 carbon atoms) and hydrogen cyanide at 750–1000° C. and atmospheric pressure. This process is an improvement over the two above commercial processes in that it involves a single reaction, and does not require the use of a catalyst.

Unexpectedly, we have discovered a one-step method of preparing acrylonitrile and other nitriles in good product yields without the use of increased pressure and/or a catalyst, and without large amounts of contaminating by-products. Our invention involves the reaction between cyanogen and ethylene, or other olefin of at least 2 carbon atoms, above about 700° C. at atmospheric pressure and without a catalyst. In addition to using cyanogen instead of hydrogen cyanide, our invention also differs from U. S. Patent 2,445,693 in that not only are the yields of acrylonitrile or other nitriles higher, but the nitriles are produced in a purer state, less contaminated by by-products and degradation contaminants. The process of our invention is economical to operate.

Accordingly, it is an object of our invention to prepare acrylonitrile in increased yields.

It is also an object of our invention to prepare acrylonitrile from cyanogen and an olefin.

It is a further object of our invention to prepare acrylonitrile in purified form.

It is yet another object of our invention to provide for the non-catalytic preparation of nitriles in an economical manner.

It is still a further object of our invention to prepare unsaturated nitriles, particularly acrylonitrile, under elevated temperatures and atmospheric pressure with no catalyst or promoter and in purified form and high yield from cyanogen and a monoolefin.

In general, therefore, our invention resides in a new method of preparing a nitrile from a suitable olefin by contacting it with a cyanogen-containing gas at atmospheric pressure and elevated temperatures. It should be understood, however, that the reaction proceeds satisfactorily at sub-atmospheric and super-atmospheric pressures.

More particularly, the reaction in the process of our invention takes place above about 700° C. without catalysts or promoters to yield a high proportion of nitriles and low amounts of undesirable contaminants.

Cyanogen, also called ethane dinitrile, dicyanogen and oxalonitrile, is a colorless, extremely toxic gas of high stability having utility in certain chemical syntheses and other chemical reactions. It has the formula $NC-CN$, which is also expressed as $(CN)_2$. Cyanogen, as utilized in the process of this invention, may be prepared by any one of a number of processes, such as the treatment of sodium cyanide or potassium cyanide with copper sulfate, the heating of mercuric cyanide or silver cyanide, or the reaction of hydrogen cyanide with chlorine gas at higher temperatures. Cyanogen obtained from any one of these processes or any equivalent process is satisfactory for use in the process of our invention.

The hydrocarbons which may be utilized in accordance with this invention are olefins having two or more carbon atoms. Examples of olefins are ethylene, propylene and butylene. Lower molecular weight olefins or mixtures thereof, with or without other materials present, such as saturated and/or aromatic hydrocarbons, are preferred, particularly single, substantially pure, low molecular weight olefins with only one double carbon to carbon bond. The types of nitriles obtained by the process of our invention depend to some extent upon the olefins used as reactants. Thus, ethylene reacts to produce acrylonitrile. Propylene reacts to produce acrylonitrile and the next higher homologue in the series which has the molecular formula $C_4H_5N$. In both cases acetonitrile and hydrogen cyanide are also formed. The olefins or hydrocarbon mixtures containing the olefins are ordinarily obtained from petroleum cracking processes by standard methods. Thus, for example, in the refining of a hydrocarbon oil, such as a Mid-Continent crude, for the production of gasoline by cracking, large volumes of mixed gases are evolved which contain considerable proportions of olefins. These olefins are mainly the lower molecular weight olefins, and, after suitable separation or concentration, they may be utilized in the process of this invention. Olefins may be also obtained from any other source, such as by pyrolysis of paraffinic gases.

The process of our invention comprises contacting the olefin-containing gas with the cyanogen-containing gas at sufficiently high temperatures to bring about the desired reaction. The cyanogen-containing gas is first mixed with the olefin or mixture of olefins in gaseous form in any suitable manner, such as, for example, merely introducing each gas to the inlet of a reaction zone and allowing the molecular activity of each to cause sufficient intermixing and diffusion of the components within the reaction zone. Other suitable means includes circulating the gases in the presence of a moving fan, paddle or blade which aids in the dispersion of the gases. The olefins or olefin and the cyanogen may be admixed in any ratio or volume. Preferably, ethylene is used in a molar ratio of 1–10:1 of the cyanogen. Thus, for example, a suitable molar ratio of ethylene to cyanogen is 5:1. Ratios of ethylene to cyanogen, however, may vary from volume ratios of 1:20 to ratios of 20:1. Other olefins may be utilized in the same or different ratios to cyanogen.

After admixing, the gaseous mixture is reacted at atmospheric pressure and in the reaction zone at a temperature of at least about 700° C., preferably from about 750 to 1000° C. No catalysts are present in the reaction zone, which may be any conventional type of conversion apparatus containing any standard type of heat transfer. Thus, for example, a pebble heater may be utilized to obtain the reaction temperature and the gases may be flowed along the surface of the layer of the pebbles and up or down therethrough as in conventional processing. The heat transfer medium may be ceramic pebbles, etc. Alternatively, equally effective is a metallic chamber heated to reaction temperature by indirect means such as metallic coils heated with steam within or outside the chamber. Any other suitable means may be employed to obtain the relatively high temperatures necessary for the reaction. The gas mixture is passed through the reaction zone at a relatively high velocity, such as 200 to 500 gaseous hourly space velocity. On reacting, the cyanogen and olefin, for example, ethylene, produces an unsaturated nitrile according to the following equations:

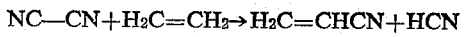

NC—CN+H₂C=CH₂→H₂C=CHCN+HCN or

2H₂C=CH₂+NC—CN→2H₂C=CHCN+H₂

After the reaction has occurred and the acrylonitrile and other nitriles are formed, the reacted gas mixture is then passed from the reaction zone to a cooling zone. The nitrile-containing gas may then be separated, if desired, from the unreacted gas mixture by solvent extraction, fractional distillation after condensation or other similar standard means of separating heterogeneous boiling mixtures. The separation of the acrylonitrile is unnecessary where it is desired to recycle the product and unreacted gases together to the reaction zone for further reaction until a certain level of concentration of product has been obtained. Where the nitriles are removed from the unreacted gases, the remaining gases may be recycled to the reaction zone for further reaction.

The process may be run on a batch basis, as above, or on semi-continuous or continuous basis. When a continuous operation is desired, fresh gas comprising cyanogen and an olefin is constantly introduced into the reaction chamber while product gases are constantly removed for further treatment, such as separation of products and recycling of unreacted constituents, etc., which treatment may be continuous or intermittent.

The process of our invention is further illustrated by reference to the following Table I, which gives the conditions of reaction and results obtained in four runs using (CN)₂ and in four runs using HCN.

acrylonitrile to acetonitrile from ethylene was about 4 to 1 with cyanogen in comparison to 3 to 2 with hydrogen cyanide, as shown in the prior art. Thus, it is seen that not only is acrylonitrile produced in a much higher molar yield per pass when cyanogen is the initial reactant rather than the hydrogen cyanide, but also the gaseous product contains acrylonitrile in purer form with smaller amounts of acetonitrile present.

It is to be understood that the process of our invention may be modified by the addition thereto or substitution therefor of suitable steps and/or equipment as are obvious to those skilled in the art.

We claim and particularly point out as our invention:

1. The process for the preparation of aliphatic nitriles which comprises the step of heating a mixture of cyanogen and hydrocarbon gas containing a substantial amount of monoolefins to a temperature above 700° C.

2. The process of claim 1 in which the reaction takes place in the absence of catalyst and promoters and at atmospheric pressure.

3. The process of claim 2 in which said cyanogen is substantially pure cyanogen, said gas is substantially pure ethylene and said temperature is about 750–1000° C.

4. The process of claim 3 in which the ethylene is present in a molar ratio to cyanogen of about 20:1 to 1:20.

5. The process of claim 1 in which the olefin is propylene.

6. The process of claim 4 in which the molar ratio of ethylene to cyanogen is between 1:1 and 10:1.

7. The process of preparation of acrylonitrile which comprises admixing substantially pure cyanogen with substantially pure ethylene in a molar ratio of 4–5 moles of ethylene to 1 mole of cyanogen, introducing the admixture at a gaseous hourly space velocity of about 250 to a reaction zone heated to about 700–800° C., and recovering acrylonitrile from the reacted gases.

8. The process for preparing acetonitrile comprising reacting a hydrocarbon gas containing a substantial amount of monoolefins with cyanogen at temperatures between about 750° and 1000° C.

9. The process of preparing methyl acrylonitriles comprising reacting propylene with cyanogen at temperatures between about 700 and 1000° C.

10. The process for preparing aliphatic nitriles comprising reacting hydrocarbon gas rich in monoolefins with cyanogen at a temperature of 700–1000° C. for a period of time sufficient to form a substantial amount of acrylonitrile.

11. Process in accordance with claim 10 in which the gas is rich in ethylene.

12. Process in accordance with claim 10 in which the gas is rich in propylene.

Table I

| Run No. | 56 | 57 | 54 | C-9 | 8 | 9 | 11 | 10 |
|---|---|---|---|---|---|---|---|---|
| Olefin | C₂H₄ | C₂H₄ | C₂H₄ | C₃H₆ | C₂H₄ | C₂H₄ | C₂H₄ | C₂H₄ |
| Cyanogen Compound | (CN)₂ | (CN)₂ | (CN)₂ | (CN)₂ | HCN | HCN | HCN | HCN |
| Reactor Packing [1] | BS | BS | BS | None | CIB | CIB | None | CIB |
| Temp. (° C.) | 701 | 753 | 800 | 750 | 800 | 850 | 850 | 900 |
| Mol Ratio: olefin/other | 4.6 | 4.6 | 5.0 | 4.5 | 11.0 | 11.0 | 7.7 | 8.6 |
| GHSV of charge gas | 249 | 249 | 246 | 228 | 285 | 285 | 304 | 301 |
| Mole Percent Conversion of olefin | 1.03 | 7.8 | | 17.2 | | | | |
| Mole Percent Conversion of (CN)₂ or HCN | 5.4 | 11.5 | | 3.3 | 15.7 | 31 | 42 | 32 |
| Yield per pass of CH₂=CHCN | 2.8 | 10.7 | 29 | 1.3 | 2.6 | 4.7 | 6.9 | 10.0 |
| Selectivity for CH₂=CHCN | 52 | 93 | | 39 | 16.8 | 14.8 | 16.4 | 31 |
| Yield per pass of CH₃CN | 0.0 | 2.8 | | 3.2 | | | | |
| Selectivity for CH₃CN | 0.0 | 24 | | 99 | | | | |
| Yield per pass of C₄H₅N | | | | 1.3 | | | | |
| Selectivity for C₄H₅N | | | | 39 | | | | |

[1] BS = ¼″ Berl saddles. CIB = ⅛″ ceramic insulating beads.

It is seen from the above table that the molar yield of acrylonitrile per pass was much higher in the case where cyanogen was utilized as a reactant rather than hydrogen cyanide. Moreover, higher yields of acrylonitrile were obtained utilizing cyanogen instead of hydrogen cyanide even though the reaction utilizing hydrogen cyanide was carried out at temperatures approximately 100–150° C. higher. The results also indicated that the ratio of References Cited in the file of this patent
UNITED STATES PATENTS
2,745,864    Dixon _____ May 15, 1956

OTHER REFERENCES
Janz, Jour. Amer. Chem. Soc., vol. 74, pgs. 4529–31 (1952).